Patented Feb. 15, 1949

2,462,048

UNITED STATES PATENT OFFICE 2,462,048

EPOXY TETRAMETHYLOL METHANE AND POLYMERIZATION PRODUCTS THEREOF

Joseph A. Wyler, Allentown, Pa., assignor to Trojan Powder Company, a corporation of New York No Drawing. Application May 10, 1946,
Serial No. 668,774

6 Claims. (Cl. 260—333)

This invention relates to a composition of matter and method of making it and more particularly to 1,3-(2,2 dimethyl propane monoxide and its derivatives.

The application is a continuation in part of application Serial No. 665,321 filed by me on April 26, 1946 and entitled Pentaerythritol Condensation Products.

In this copending application there is described the condensation of molecules of pentaerythritol and certain derivatives of it by heating with mineral acids such as sulfuric and phosphoric acid. The copending application is directed primarily to the making of complex compounds in which a plurality of molecules of the selected pentaerythritol compound is condensed with the elimination of one less molecule of water than there are molecules of the pentaerythritol compound involved in the condensation. Thus, two molecules of pentaerythritol itself on warming with a minor proportion of sulfuric acid gives polypentaerythritols; water being eliminated. There is disclosed in the copending application also the formation of a compound of the formula:

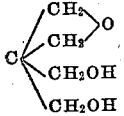

This compound I call for convenience by the name epoxytetramethylol methane, the compound being related to pentaerythritol, which is tetramethylol methane, by the replacement of two hydroxy groups in a molecule by an oxygen atom, this replacement being accompanied by the loss of one molecule of water from a molecule of the pentaerythritol. In a different system of nomenclature the compound is 1,3-(2,2 dimethylol) propane monoxide.

The present invention is directed to this 1,3-(2,2 dimethylol) propane monoxide and also to its reaction products, particularly with pentaerythritol, and their preparation and separation from pentaerythritol or the condensation products thereof such as one of the polypentaerythritols.

Briefly stated, the invention comprises the compounds of the 1,3-(2,2 dimethylol) propane monoxide class, of the general but not structural formula

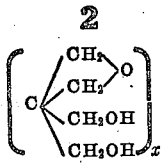

in which $x$ is an integral number and ordinarily 1 to 7 inclusive. The invention comprises also the herein described method of preparing such compounds which includes removal of water from pentaerythritol to give the monomer 1,3-(2,2 dimethylol) propane monoxide and the separation of it, or its polymers formed on further warming, as by crystallization or by crystallization followed by differential settling rates of crystals of the polymer and other compounds present in a substantially anhydrous, selective solvent medium of which butanol is an example.

Water is first eliminated from pentaerythritol by warming with sulfuric acid, phosphoric acid or like condensation accelerator as described in my said copending application. The product so obtained, which will be a mixture of monoxide material and unchanged pentaerythritol and polypentaerythritol condensation products thereof, is then subjected to treatment to separate the epoxy material or its polymers from the pentaerythritol condensation products.

This treatment in the preferred method involves separation of alcohol-soluble material by treatment with alcohol followed by dehydration and crystallization of the product. This alcohol and the butanol recited in the following paragraph are examples of lower aliphatic alcohols.

In another embodiment the method includes concentrating an aqueous solution of the product first formed by the acid treatment of the pentaerythritol compound, continuing the concentration almost to the point of crystallization, and then adding a volatile liquid that is not a solvent for the epoxy compound, as, for example, butanol, distilling the mixture, separating the condensate into an aqueous and non-aqueous layer, and returning the non-aqueous layer to the still until substantially all the water is removed. There results a suspension of crystals of pentaerythritol, its condensation products and the epoxy compounds in the liquid. When boiling is discontinued, the crystals of the penta compounds settle rapidly whereas the crystals of the epoxy compounds settle slowly. The suspension of the slowly settling epoxy compounds is then decanted away from the crystals of the penta compound. The crystals of the epoxy compounds so separated may then be further purified by recrystallization as from hot water.

Compounds made as described are considered to have the general structure shown in the following formula:

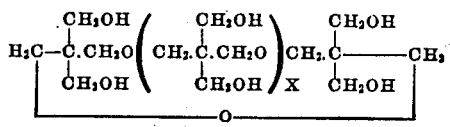

in which X=one or any whole number. For the trimer X=1 and for the pentamer X=3. For the heptamer X=5.

These new epoxy compounds give the ethylene oxide type of reactions with various organic materials and cause introduction into such materials of hydroxy groups which in my new products are associated with the epoxy group. These 1,3-(2,2 dimethylol) propane monoxide compounds, in polymerizing with themselves, give higher molecular weight polymers of abnormally low hydroxy content in proportion to their molecular weight and of very high molecular weight and complexity, without the formation of a rubbery product.

The 1,3-(2,2 dimethylol) propane monoxide and its polymers, particularly the trimer and the pentamer, are useful especially as bodying agents in the making of resins. Thus linseed oil fatty acids body rapidly with as little as 1% of any of the epoxy compounds to which reference has been made.

The invention will be further illustrated by detailed description in connection with the following specific examples of the practice of it.

EXAMPLE 1

*Preparation of trimer of 1,3-(2,2 dimethylol) propane monoxide*

Pure pentaerythritol was heated with 0.2% of its weight of sulfuric acid with the liberation of water, in accordance with the process disclosed in my said copending application, until the OH content of the product was about 37%. More specifically the pentaerythritol and sulfuric acid mixture was heated at a temperature of 220° to 235° C. for a few minutes and the heating discontinued when a sample removed and tested by standard methods shows hydroxyl content of 37%. The contents were then discharged into a cooling pan.

100 parts of this product were refluxed with 400 parts of ordinary commercial ethyl alcohol for about 2 hours and the hot mixture filtered. The filtrate was evaporated to dryness on the steam bath, taken up in hot water, decolorized by means of charcoal, filtered, and this filtrate placed in a suitable still and evaporated to small volume.

Just before any crystals are caused to separate during the evaporation, normal butyl alcohol is added in a steady stream in order to effect an azeotropic distillation, to dehydrate the mixture and to cause the separation of clean-cut crystals. By this procedure coarse crystals of pure pentaerythritol (unconverted in the original heating process) and fine crystals of the trimer of 1,3-(2,2 dimethylol) propane monoxide separate. The latter crystals are readily separated by decantation from the denser crystals of pentaerythritol, as by stirring the whole mixture and pouring off the suspended crystals as soon as the larger crystals have settled.

50 parts of this fine material were dissolved in 200 parts of hot water, the mixture cooled to room temperature and the crystals which form filtered off, washed and dried.

The trimer, 1,3-(2,2 dimethylol) propane monoxide, is a white pulverulent, crystalline product of M. P. about 208° C., somewhat soluble in ethyl alcohol, but less soluble in butyl alcohol, slightly soluble in cold water but more soluble in hot. It is more soluble in water containing some pentaerythritol than it is in pure water and appears to become somewhat hydroxylated upon prolonged heating in water. It is soluble in hot diethylene glycol and may be precipitated therefrom by means of ethyl alcohol or cold water.

Its formula may be written:

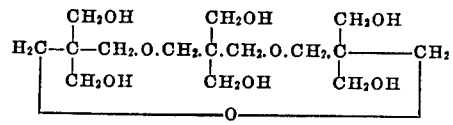

EXAMPLE 2

*Preparation of the pentamer of 1,3-(2,2 dimethylol) propane monoxide*

Pure pentaerythritol was heated with 0.2% of its weight of sulfuric acid, with the liberation of water, in accordance with the process described in Example 1, to obtain a conversion product containing 38.05% OH. One part of this product was mixed with 14 parts of water and the mixture boiled for about one half hour. The hot (90° C.+) mixture was filtered away from undissolved material and the clear filtrate allowed to cool to room temperature. The flocculent precipitate which formed was filtered off, washed with water, dried and pulverized.

This pulverized product melted at about 230.5° C. and contained 29.69% OH, by acetyl method of analysis which, it should be said, gives only approximate percentages. It was again boiled up in water (3 times its weight of water) and filtered at 70° C. The material filtered off was 81% of the weight of the impure product started with and now melted at 233.5–234.5° C. A second such treatment did not alter the melting point of the product which was a white, pulverulent, low-density material, difficultly soluble in water, although slightly more soluble in the hot than in the cold; insoluble in anhydrous alcohol; soluble in hot diethylene glycol, from which it may be precipitated by means of ethyl alcohol; rather difficultly soluble in glycol or glycerine and insoluble in ether.

The purified product contains no ketonic or aldehydic groups and was found to be the pentamer of the general but not structural formula

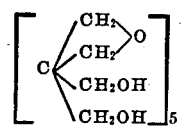

which by nitration contains 28.79% OH. For such compound the molecular weight should be 590.65. By nitrating the compound to the decanitrate, dissolving the decanitrate in trinitrotoluene, measuring the depression of the freezing point of the T. N. T. by a known weight of the decanitrate, and calculating the molecular weight of the pentamer, the molecular weight was found to be within 3.5% of the theory, an agreement that is considered satisfactory under the circumstances.

EXAMPLE 3

*Preparation of the heptamer of 1,3-(2,2 dimethylol) propane monoxide*

Pure pentaerythritol was heated with 0.2% of its weight of sulfuric acid, with the liberation of water, in accordance with the process disclosed in my said copending application and as described in Example 1 above, to obtain a conversion product of OH content about 30%, say 28% to 32%.

One part of this product was mixed with 14 parts of water and the mixture boiled for about one-half hour. The hot (90° C.+) mixture was filtered and the residue repeatedly treated with boiling water and filtered at a temperature above 90° C., until a test of the clear filtrate indicated practically no hot water soluble material left in the residue. This repeated boiling in water removes the lower polymers which are relatively more soluble than the higher which are practically insoluble in water but soluble in hot glycerine or diethylene glycol from which they may be precipitated by means of ethyl alcohol, methyl alcohol, or water.

In the present example, in which a 30% OH conversion product was initially used, the final insoluble fraction obtained above was found to be the heptamer, that is,

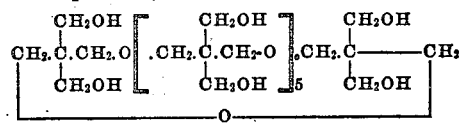

This product is then dried.

The heptamer so obtained is almost infusible, extremely difficultly soluble in water, and of such a degree of hardness that it is very difficult to pulverize. It is somewhat soluble in hot pyridine and its hydroxyl content can be determined in pyridine solution.

In this example, it is necessary to carry out the original conversion step to obtain a low hydroxyl value, otherwise the yields of the heptamer are too low or the heptamer present is difficult to separate from the lower polymers, especially from the pentamer.

Although, in the examples given, I have used a pentaerythritol conversion product made with H₂SO₄, I do not confine myself solely to this particular type of product. I may use a product made from phosphoric acid in any of its forms which are effective in splitting off water from pentaerythritol as described in my said copending application, or I may use a pentaerythritol product made from any other agent capable of removing water from pentaerythritol in essentially the same manner. Although the products used in the examples contained about 37% of OH I do not confine myself to this or any other specific OH content. I may use a product containing as low as about 26% OH, although I prefer one containing about 34% OH. If the —OH content is too low, the separations become more difficult. If the —OH content is too high, the yields obtained are too low.

It will be understood that it is intended to cover all changes and modifications of the examples of the invention herein chosen for the purpose of illustration which do not constitute departures from the spirit and scope of the invention.

What I claim is:

1. A 1,3-(2,2 dimethylol) propane monoxide compound of the general formula

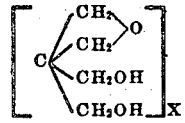

in which X represents an odd integral number within the range 1 to 7 inclusive.

2. The method of making a compound of the kind described in claim 1 which comprises heating pentaerythritol with a small proportion of a mineral acid, to cause condensation of molecules of pentaerythritol with loss of water and decrease of hydroxy content of the remaining product, refluxing the product with a lower aliphatic alcohol solvent, and then crystallizing the material from hot water.

3. The method of making a compound of the kind described in claim 1 which comprises heating pentaerythritol with a small proportion of a mineral acid, to cause condensation of molecules of pentaerythritol with loss of water and decrease of hydroxy content of the remaining product, to form a wet composition including the 1,3-(2,2 dimethylol) propane monoxide compound of the kind described in claim 1 and unchanged pentaerythritol, suspending the said composition in butanol, warming and distilling the mixture until practically all water is removed from the mixture, adding any additional butanol required to keep the said composition suspended in the butanol, allowing the suspension to settle until coarse crystals therein have settled, and then decanting off the supernatant liquor and 1,3-(2,2 dimethylol) propane monoxide compound suspended therein, the coarse crystals separated by settling containing most of the unchanged pentaerythritol.

4. In making the heptamer of 1,3-(2,2 dimethylol) propane monoxide, the method which comprises heating pentaerythritol with a minor proportion of an acid serving as a dehydration catalyst until the content of hydroxy groups is reduced to about 30%, repeatedly extracting the product with hot water to remove lower polymers of the 1,3-(2,2 dimethylol) propane monoxide, and then drying the heptamer which remains undissolved.

5. 1,3-(2,2 dimethylol) propane monoxide.

6. The trimer of 1,3-(2,2 dimethylol) propane monoxide.

JOSEPH A. WYLER.

REFERENCES CITED

The following references are of record in the file of this patent:

UNITED STATES PATENTS

| Number | Name | Date |
|---|---|---|
| 2,062,404 | Dreyfus | Dec. 1, 1936 |
| 2,110,695 | Batchelder | Mar. 8, 1938 |
| 2,275,494 | Bennett | Mar. 10, 1942 |
| 2,334,565 | Lieber et al. | Nov. 16, 1943 |
| 2,401,749 | Burghardt et al. | June 11, 1946 |

Certificate of Correction

Patent No. 2,462,048.  February 15, 1949.

JOSEPH A. WYLER

It is hereby certified that errors appear in the printed specification of the above numbered patent requiring correction as follows:

Column 1, line 3, for "dimethyl" read *dimethylol*; column 4, line 42, for "29.69% read *29.62%*;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*